UNITED STATES PATENT OFFICE.

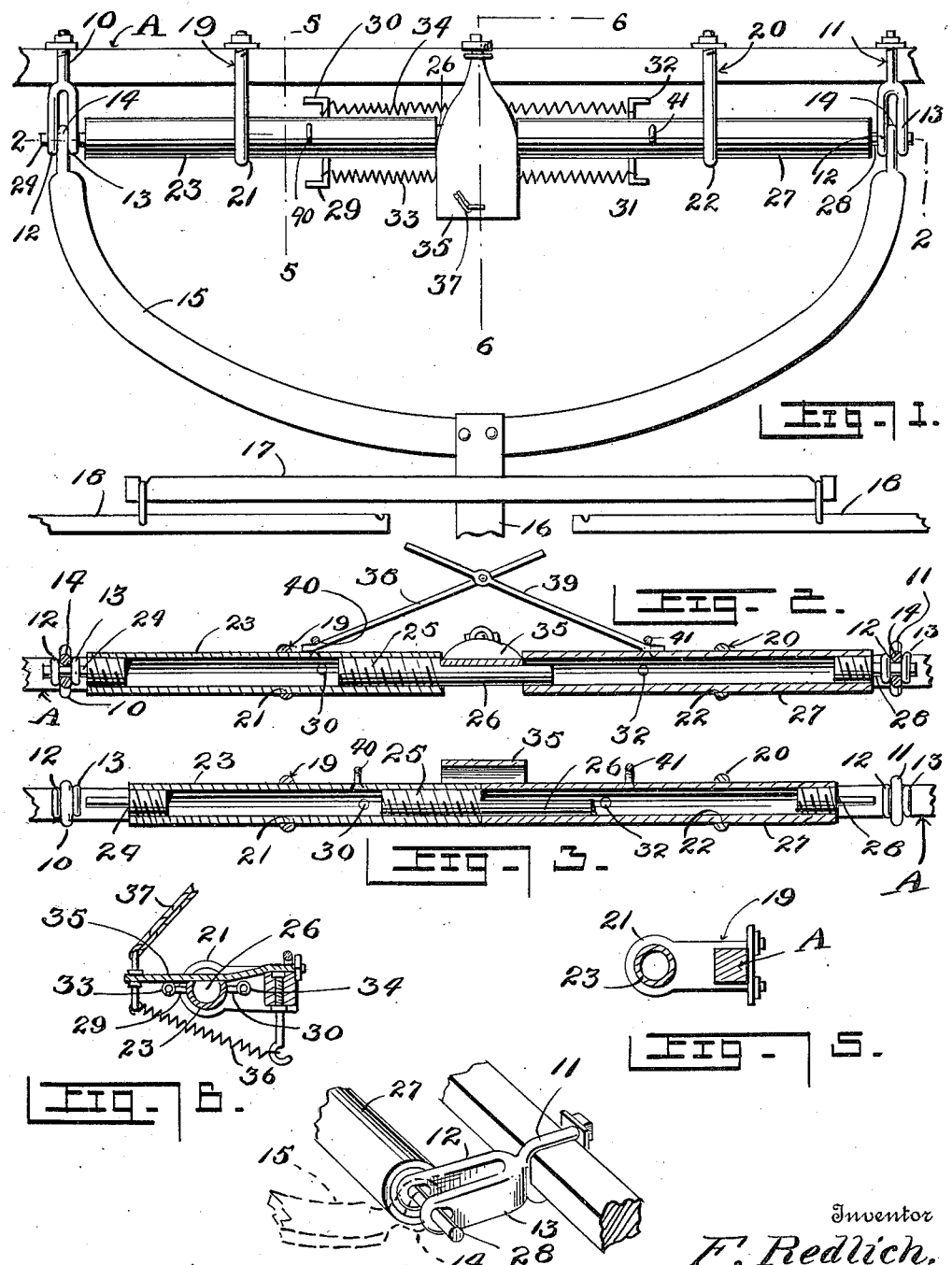

FRANK REDLICH, OF YANKEE, NEW MEXICO.

HORSE-RELEASER.

1,043,971.   Specification of Letters Patent.   Patented Nov. 12, 1912.

Application filed April 25, 1912. Serial No. 693,232.

*To all whom it may concern:*

Be it known that I, FRANK REDLICH, a citizen of the United States, residing at Yankee, in the county of Colfax, State of New Mexico, have invented certain new and useful Improvements in Horse-Releasers; and I do hereby declare the following to be a full, clear, and exact description of the invention, such as will enable others skilled in the art to which it appertains to make and use the same.

This invention relates to horse releasers.

The object of the invention resides in the provision of a simple appliance which can be associated with vehicles for the purpose of releasing the shafts whenever the horse or horses become unmanageable, thereby permitting the horse or horses to escape without damaging the vehicle or injuring the occupants thereof.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a plan view of the forward axle of a vehicle showing the invention applied, Fig. 2, a section on the line 2—2 of Fig. 1, Fig. 3, a view similar to Fig. 2 showing the parts of the device in released position, Fig. 4, a detail perspective view showing the manner of locking the shaft to the axle, Fig. 5, a section on the line 5—5 of Fig. 1, and Fig. 6, a section on the line 6—6 of Fig. 1.

Referring to the drawings A indicates the forward axle of a vehicle which has mounted thereon at the usual spaced points thill couplings 10 and 11. Each of these couplings is provided at its forward end with spaced ears 12 and 13 between which are adapted to be received respective ears 14 of a tongue yoke 15. It will of course be understood that the ears 12, 14 and 13 are provided with registering openings to receive a respective locking pin of the releaser. The yoke 15 is connected to the usual tongue 16 and this tongue has mounted thereon a double tree 17 which carries at each end the usual swingle tree 18.

Mounted on the axle A between the thill couplings 10 and 11 are brackets 19 and 20 provided at their forward ends with alining eyes 21 and 22 respectively. Slidably mounted in the eye 21 is a tubular rod 23 the outer end of which has threaded therein a locking pin 24 while the inner end thereof has threaded therein a solid rod 25 the outer end of which is provided with a reduced portion 26. Slidably mounted in the eye 22 is a tubular rod 27 which has threaded in its outer end a locking pin 28 while its inner end is left open to receive the reduced portion 26 of the rod 25 when said tubular rods 23 and 27 are moved toward each other as will hereinafter appear. Fixed on the tubular rod 23 are laterally projecting pins 29 and 30 while corresponding pins 31 and 32 are fixed on the tubular rod 27. Connecting the pins 29 and 31 is a spring 33 while a corresponding spring 34 connects the pins 30 and 32. These springs 33 and 34 constantly tend to slide the tubular rods 23 and 27 toward each other as will be apparent. The rods 23 and 27 are adapted to be held separated against the influence of the springs 33 and 34 by means of a locking plate 35 suitably secured to the axle A and adapted to rest upon the reduced portion 26 of the rod 25 between the ends of the rods 23 and 27. A spring 36 has one end connected to the free end of the plate 35 and its other end suitably anchored to the axle A, said spring constantly tending to draw the free end of the plate 35 downwardly against the reduced portion 26.

In setting the releaser the ends of the yoke 15 are disposed so that the openings in the ears 12, 14 and 13 register. The rods 23 and 27 are then forced outwardly to move the locking pins 24 and 28 into these registering openings. When the inner ends of the rods 23 and 27 have been moved away from each other a sufficient distance the plate 35 will be drawn by the spring 36 against the reduced portion 26 and said plate thus interposed between the inner ends of the rods 23 and 27 will lock said rods against movement toward each other under the influence of the springs 33 and 34. While the parts of the releaser are in this relation the yoke 15 is secured to the axle A so that the draft of the animals will move the vehicle. In the event of a runaway the driver seated in the vehicle will through the medium of a chain 37 raise the free end of the plate 35. As soon as the plate 35 has been moved out of the plane of the rods 23 and 27 said rods will be drawn toward each other by the springs 33 and 34 which will result in the locking pins 24 and 28 being withdrawn from the registering openings of the ears 12, 14 and 13 and effect the release of the yoke 15 from the axle.

The rods 23 and 27 are adapted to be moved away from each other so as to receive the plate 35 therebetween by means of a tool formed of a pair of pivotally connected cross levers 38 and 39 the lower ends of which are bent at an angle and engage respectively in eye members 40 and 41 mounted on the rods 23 and 27 respectively.

What is claimed is:

In a horse releaser the combination with an axle, of a pair of thill couplings mounted on said axle, a pair of brackets mounted on said axle between the thill couplings, a tubular member slidable in each of said brackets, a plug provided with a locking pin threaded in the outer end of each of said tubular members and adapted to be moved into and out of locking relation to the thill couplings respectively as said tubular members are moved away from and toward each other, means constantly tending to move the tubular members toward each other, a plug threaded in the inner end of one of said tubular members and provided with an outer reduced portion slidable in the inner end of the other tubular member, a plate pivoted on the axle and movable to a position between the adjacent ends of said tubular members and on the reduced portion of the last named plug to hold the tubular members against movement toward each other, and means for moving said plate from between the adjacent ends of the tubular members to release the latter for movement toward each other.

In testimony whereof, I affix my signature, in presence of two witnesses.

FRANK REDLICH.

Witnesses:
 LEE S. KELLOGG,
 C. L. RINKER.

---

Copies of this patent may be obtained for five cents each, by addressing the "Commissioner of Patents, Washington, D. C."